United States Patent [19]

Nakamura et al.

[11] 4,210,112
[45] Jul. 1, 1980

[54] ELECTRONICALLY CONTROLLED EXHAUST GAS RECIRCULATION SYSTEM IN INTERNAL COMBUSTION ENGINE

[75] Inventors: Koyo Nakamura; Hastuo Nagaishi, both of Yokosuka, Japan

[73] Assignee: Nissan Motor Company, Limited, Yokohama, Japan

[21] Appl. No.: 971,493

[22] Filed: Dec. 20, 1978

[30] Foreign Application Priority Data

Dec. 28, 1977 [JP] Japan .............. 52-159577

[51] Int. Cl.$^2$ .......................................... F02M 25/06
[52] U.S. Cl. ................................................ 123/571
[58] Field of Search ................................ 123/119 A

[56] References Cited

U.S. PATENT DOCUMENTS

| 4,071,003 | 1/1978 | Aono | 123/119 A |
|---|---|---|---|
| 4,114,577 | 9/1978 | Aoyama | 123/119 A |
| 4,137,874 | 2/1979 | Otsubo et al. | 123/119 A |
| 4,142,495 | 3/1979 | Lahiff | 123/119 A |
| 4,147,143 | 4/1979 | Harada | 123/119 A |
| 4,161,929 | 7/1979 | Nohira et al. | 123/119 A |
| 4,164,032 | 8/1979 | Nohira et al. | 123/119 A |
| 4,165,722 | 8/1979 | Aoyama | 123/119 A |
| 4,168,683 | 9/1979 | Hata et al. | 123/119 A |

Primary Examiner—Wendell E. Burns

[57] ABSTRACT

An exhaust gas recirculation (EGR) system comprises a vacuum operated EGR control valve, a differential pressure modulator to produce a control negative pressure for operating the control valve by modulating engine intake vacuum with air, sensors to sense certain parameters of the engine operating condition and an electronic controller which memorizes an optimum control pattern with respect to engine operating conditions to provide a control signal representing an optimum EGR rate to an electromagnetic valve, which regulates the magnitude of a signal negative pressure to be applied to the pressure modulator, so that EGR can be effected exactly at an optimum rate under every operating condition of the engine.

7 Claims, 2 Drawing Figures

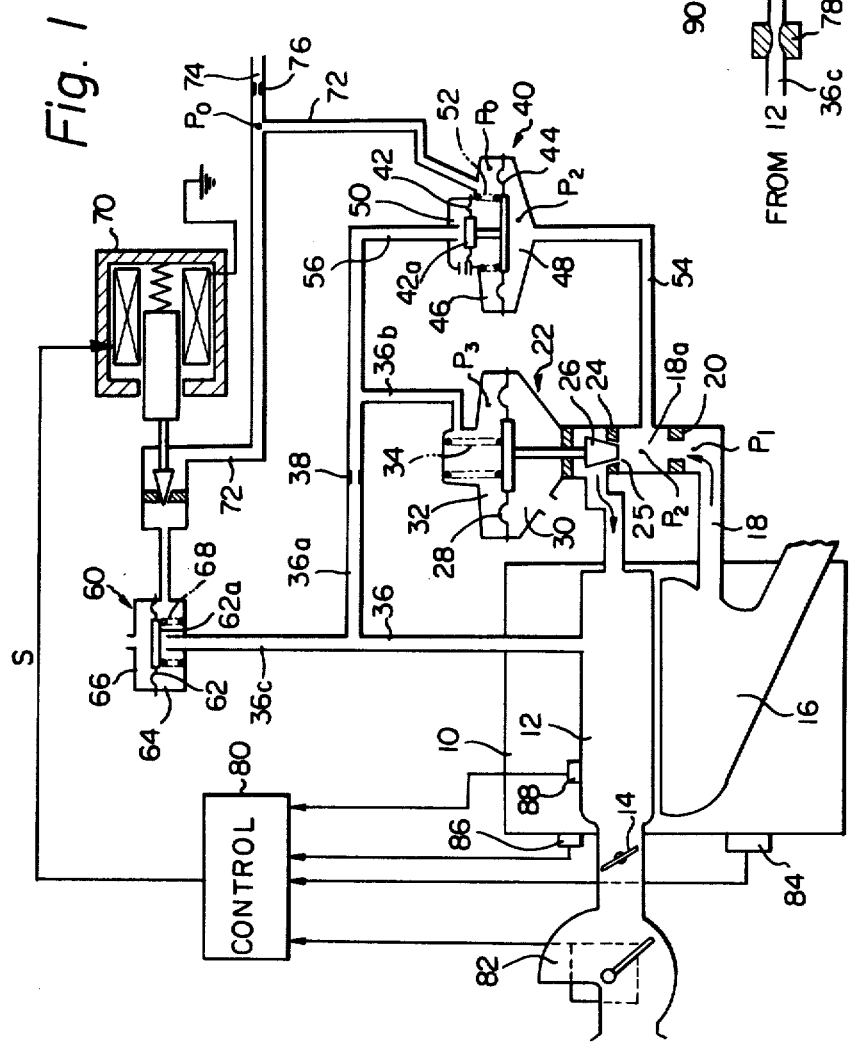
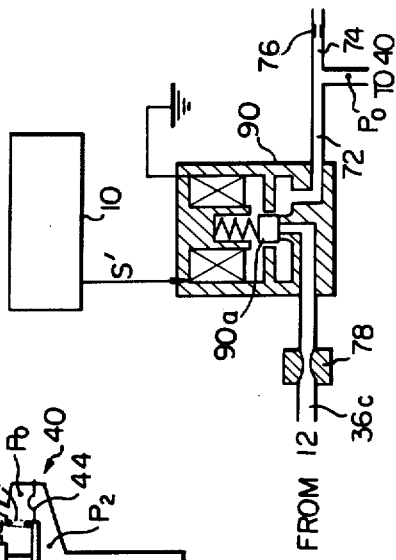

ELECTRONICALLY CONTROLLED EXHAUST GAS RECIRCULATION SYSTEM IN INTERNAL COMBUSTION ENGINE

BACKGROUND OF THE INVENTION

This invention relates to an electronically controlled exhaust gas recirculation system in an internal combustion engine.

In internal combustion engines and particularly in automotive engines, it is one of effective and prevailing methods for lessening nitrogen oxides (NOx) in the engine exhaust gas to recirculate a portion of the exhaust gas back to the engine combustion chambers. A suppresive effect of exhaust gas recirculation (EGR) augments as the rate of EGR is enhanced. The rate of EGR refers to the proportion of the quantity of the recirculated exhaust gas to the quantity of air taken into the engine or the proportion of the recirculated portion to the entire quantity of the engine exhaust gas. However, in general the performance of the engine represented by practically important items such as fuel economy, output characteristic and smoothness of operation is adversely affected by the recirculation of exhaust gas. Accordingly the rate of EGR should be controlled according to operating conditions of the engine so as to achieve satisfactory suppression of NOx emission without significantly impairing the performance of the engine.

Most of conventional EGR systems employ a pressure-responsive flow control valve as an EGR control valve and utilize a vacuum created in the engine intake system and/or exhaust pressure directly as a pressure signal for operating the control valve. This type of control valves have limitations on their precision due to tolerances permitted in the production, deposition of foreign matter thereon during use in exhaust gas and deterioration of certain components such as springs by long exposure to high temperatures of exhaust gas. A direct use of intake vacuum and/or exhaust pressure to operate the EGR control valve also puts limitations on both the accuracy and freedom of the control of EGR rate. For such reasons it has been difficult to optionally vary the rate of EGR so as to be always optimum under various operating conditions of the engine. Particularly, there is a tendency that the rate of EGR becomes excessively high under high speed low load conditions and low speed low-to-medium load conditions.

SUMMARY OF THE INVENTION

It is an object of the present invention to provide an exhaust gas recirculation system in an internal combustion engine, particularly of automotive use, which system includes electronic control means for detecting actual operating conditions of the engine, memorizing an optimum control pattern of EGR rate with respect to engine operating conditions and controlling the magnitude of a negative pressure to operate an EGR control valve based on the detected engine operating conditions and the memorized control pattern and hence can control the rate of EGR in the most suitable manner with high precision and reliability over the entire range of engine operating conditions.

According to the invention, an exhaust gas recirculation system in an internal combustion engine provided with an induction passage and an exhaust passage comprises the following components: (a) a recirculation passage interconnecting the exhaust passage to the induction passage to recirculate a portion of the engine exhaust gas to the engine combustion chambers; (b) a metering orifice of a fixed area formed in the recirculation passage; (c) a vacuum operated control valve for controlling an effective cross-sectional area of the recirculation passage at a section downstream of the metering orifice; (d) a pressure modulator for modulating a vacuum produced in the induction passage with air based on a comparison between a signal negative pressure and an exhaust gas pressure in a control section of the recirculation passage between the metering orifice and the control valve thereby to produce a control negative pressure to operate the control valve; and (e) a conduit which connects the induction passage to the pressure modulator to transmit the aforementioned vacuum and has an air admission port opening into the atmosphere. The signal negative pressure is produced by modulation of a negative pressure in the conduit (e) with atmospheric air admitted into this conduit through the air admission port. The system further comprises: (f) an electromagnetic valve which is provided to the conduit (e) at a section between the induction passage and the air admission port so as to vary the magnitude of a negative pressure at the air admission port of the conduit (e) thereby to vary the magnitude of the signal negative pressure; (g) a plurality of sensors each for sensing a parameter of engine operating conditions and producing an electrical signal representing the sensed parameter; and (h) an electronic controller which has the function of providing a control signal to the electromagnetic valve to control the magnitude of the signal negative pressure and hence the magnitude of the control negative pressure such that the exhaust gas pressure in the control section of the recirculation passage to regulated to a value corresponding to an optimum rate of exhaust gas recirculation under an engine operating condition detected from the signals produced by the sensors (g), the optimum rate of exhaust gas recirculation being prescribed in an exhaust gas recirculation rate control pattern memorized in this controller.

BRIEF DESCRIPTION OF THE DRAWING

FIG. 1 is a diagrammatic presentation of an exhaust gas recirculation system according to the present invention; and FIG. 2 shows a partial modification of the system of FIG. 1. cl DESCRIPTION OF THE PREFERRED EMBODIMENTS In FIG. 1, reference numeral 10 indicates a main body of an automotive internal combustion engine provided with an induction passage 12 comprising therein a throttle valve 14 and an exhaust passage 16. An exhaust gas recirculation passage 18 interconnects the exhaust passage 16 with the induction passage 12 at a section downstream of the throttle valve 14 to recirculate a portion of the engine exhaust gas back to the engine combustion chambers.

An orifice 20 of a fixed area is formed in the recirculation passage 18, and an EGR control valve 22 is provided to this passage 18 at a distance downstream from the orifice 20. The EGR control valve 22 comprises an annular valve seat 24 formed in the recirculation passage 18 and a tapered valve member 26 whose position relative to the valve seat 24 determines an effective area of an orifice 25 given by the valve seat 24. In the recirculation passage 18, a section 18a between the orifice 20 and the valve seat 24 will be referred to as a control section. During operation of the engine 10, the quantity of the recirculated exhaust gas, i.e. the flow rate of the exhaust gas through the recirculation passage 18, is determined by the area of the orifice 20 and a pressure difference across the orifice 20, i.e. the difference between an exhaust gas pressure $P_1$ in the recirculation passage 18 upstream of the orifice 20 and a pressure $P_2$ in the control section 18a. The pressure $P_2$ is lower than the exhaust gas pressure $P_1$ on the upstream side except when the EGR control valve 22 is in a fully closed state since a negative pressure in the induction passage 12 downstream of the throttle valve 14 communicates to the control section 18a. In the system of FIG. 1, the quantity of the recirculated exhaust gas is controlled by controlling the degree of opening (effective area of the orifice 25) of the EGR control valve 22 thereby controlling the pressure $P_2$ in the control section 18a relative to the exhaust gas pressure $P_1$ upstream of the metering orifice 20.

An actuator portion of the EGR control valve 22 has a flexible diaphragm 28 which serves as a partition between a chamber 30 which is isolated from the recirculation passage 18 and communicates with the atmosphere and a work chamber 32 to which is applied a controlled negative pressure $P_3$ through a conduit 36 as will be described hereinafter. An end portion or stem of the valve member 26 protrudes hermetically into the atmospheric pressure chamber 30 to be fixed to the diaphragm 28, and a spring 34 is installed in the negative pressure chamber 32 so as to bias the diaphragm 28 towards the atmospheric pressure chamber 30. The valve member 26 is arranged such that the opening of the valve 22 (effective area of the orifice 25) increases as the diaphragm 28 deflects towards the negative pressure chamber 32.

Some of conventional EGR control systems comprise an EGR control valve fundamentally identical with the control valve 22 in FIG. 1 and make a direct use of either intake manifold vacuum or venturi section vacuum as a negative pressure which is applied to the chamber 32 of the control valve to control the rate of EGR according to the operating condition of the engine. The control system according to the invention, too, utilizes intake vacuum as the source of the negative pressure $P_3$ for operation of the EGR control valve 22, but this system includes, in combination with the control valve 22, a differential pressure modulator 40, a negative pressure circuit to transmit a signal negative pressure $P_0$ to this device 40, an electromagnetic valve 70 to control the magnitude of this negative pressure $P_0$ and an electronic control circuit 80 which supplies a control signal S based on the operating condition of the engine 10 to the electromagnetic valve 70 with the purpose of producing the negative pressure $P_3$ by minute modulation of the intake vacuum thereby to accomplish an exceedingly precise control of the EGR rate in compliance with the operating condition of the engine.

The differential pressure modulator 40 has a small diaphragm 42 in a housing 41 and a larger diaphragm 44 in the same housing 41 spaced from and parallel to the smaller diaphragm 42. These two diaphragms 42 and 44 are connected by a rigid rod 45 such that deflection of one of the two diaphragms 42, 44 causes deflection of the other in the same direction. The two diaphragms 42 and 44 divide the interior of the housing 41 into three chambers, namely, a signal negative pressure chamber 46 defined between the two diaphragms 42 and 44, a compensation pressure chamber 48 partitioned by the larger diaphragm 44 and an atmospheric pressure chamber 50 partitioned by the smaller diaphragm 42. A spring 52 is installed in the negative pressure chamber 46 so as to bias the larger diaphragm 44 towards the compensation pressure chamber 48.

A conduit 54 connects the compensation pressure chamber 48 to the control section 18a of the exhaust gas recirculation passage 18 so that the aforementioned pressure $P_2$ is always applied to the compensation pressure chamber 48.

The aforementioned conduit 36 connects the negative pressure chamber 32 of the EGR control valve 22 to the induction passage 12 at a section downstream of the throttle valve 14, and an orifice 38 of a fixed area is formed in this conduit 36. A portion of this conduit 36 upstream of the orifice 38 is indicated by 36a and the other portion downstream of the orifice 38 by 36b. An air admission conduit 56 extends from the atmospheric pressure chamber 50 of the differential pressure modulator 40 and joins the downstream portion 36b of the negative pressure transmission conduit 36. A sheet valve 42a is attached to the smaller diaphragm 42 of the modulator 40 such that the end of the air admission conduit 38 in the atmospheric pressure chamber 50 is closed by this sheet valve 42a when the diaphragm 42 is deflected towards this chamber 50 to a certain extent.

A negative pressure circuit to apply the signal negative pressure $P_0$ to the differential pressure modulator 40 includes a negative pressure limiting valve 60, which has a diaphragm 62 as a partition between a negative pressure chamber 64 and an atmospheric pressure chamber 66. A spring 68 is installed in the negative pressure chamber 64 so as to bias the diaphragm 62 towards the atmospheric pressure chamber 66. A conduit 36c which branches from the upstream portion 36a of the negative pressure transmission conduit 36 opens into the negative pressure chamber 64, and a sheet valve 62a is attached to the diaphragm 62 so as to close the open end of the conduit 36c when the diaphragm 62 is deflected towards the negative pressure chamber 64 to a certain extent. A conduit 72 connects the negative pressure chamber 64 to the signal negative pressure chamber 46 of the differential pressure modulator 40. Since the open end of the negative pressure transmission conduit 36c in the valve 60 is closed by the sheet valve 62a when the magnitude of intake vacuum is greater than a predetermined level, the magnitude of a negative pressure transmitted through the conduit 72 does not exceed the predetermined level. A conduit 74 opening into the atmosphere branches from the negative pressure conduit 72 with the provision of metering orifice 76 therein. An electromagnetic flow control valve 70 is provided to the negative pressure conduit 72 at a section between the negative pressure limiting valve 60 and the junction of the conduits 72 and 74 to vary an effective cross-sectional area of the conduit 72 in response to the control signal S supplied from the control circuit 80. This electromagnetic valve 70 is of the type capable of continuously varying the effective cross-sectional area of the conduit 72.

The signal negative pressure $P_0$ is produced by modulating the negative pressure transmitted through the negative pressure limiting valve 60 by the admission of atmospheric air into the negative pressure conduit 72 through the conduit 74. The electromagnetic valve 70 controls the rate of air admission into the conduit 72 by varying the effective cross-sectional area of the conduit 72: the admission of air is augmented whereby the magnitude of the negative pressure $P_0$ decreases as the electromagnetic valve 70 decreases the effective cross-sectional area of the conduit 72, and vice versa.

The control circuit 80 memorizes an EGR rate control pattern with respect to operating conditions of the engine 10 and has the function of detecting the engine operating condition at any moment based on two or more input signals respectively representing certain parameters of the engine operating condition and choosing an optimum rate of EGR under the detected engine operating condition, so that the control signal S implies an optimum magnitude of the reference negative pressure $P_0$ to the realization of the chosen EGR rate. To provide the input signals to the control circuit 80, the control system utilizes certain sensors such as an air flow rate sensor 82 to detect the flow rate of air taken into the induction passage 12 and a revolution sensor 84 to detect the engine speed, optionally with the addition of a temperature sensor 86 to detect the temperature of engine cooling water and/or a negative pressure sensor 88 to sense the magnitude of intake vacuum.

The EGR rate control pattern to be memorized in the control circuit 80 is framed such that the emission of NOx from the engine 10 can be maintained below a permissible level under every operating condition of the engine 10 without impairing fuel economy, output characteristic and driveability of the engine 10 when the rate of EGR is regulated according to this control pattern. For every operating condition of the engine 10, the control pattern prescribes an optimum EGR rate. As a general description of the control pattern, EGR rate is maximized under a medium speed medium load condition, which is the most frequently employed condition, and is diminished under low speed low load conditions and high speed low load conditions. Preferably the control pattern is framed so as to decrease the rates of EGR under the respective speed-load conditions while the engine 10 is operated at unduly low temperatures. Optimum rates of EGR with respect to the engine operating conditions as the basis for the preparation of the control pattern can be determined through experiments on the engine 10 over the entire range of its operating conditions.

The control of EGR rate by the system of FIG. 1 is accomplished in the following way.

The control circuit 80 continuously detects the operating condition of the engine 10 based on the parameter signals produced by sensors such as the air flow rate sensor 82 and the engine speed sensor 84 and picks up or chooses an optimum rate of EGR under the detected engine operating condition according to the memorized control pattern. The control signal S continuously produced by the control circuit 80 is an analog signal containing an information corresponding to the optimum EGR rate chosen by the control circuit 80 at each moment.

The degree of opening of the electromagnetic valve 70 varies in response to the variable control signal S, so that the magnitude of the signal negative pressure $P_0$ transmitted to the negative pressure chamber 46 of the differential pressure modulator 40 varies according to the control signal S. When the magnitude of the negative pressure $P_0$ is augmented the larger diaphragm 44 in the modulator 40 deflects towards the negative pressure chamber 46 against the force of the spring 52, and the smaller diaphragm 42 is forced to deflect towards the atmospheric pressure chamber 50 (because of its smaller area than the diaphragm 44) with the result that the admission of atmospheric air into the conduit 56 is diminished or interrupted by the sheet valve 42a. Then there occurs augmentation of the magnitude of the control negative pressure $P_3$ which is continuously applied to the EGR control valve 22 through the conduit 36, so that the diaphragm 28 of the control valve 22 deflects towards the negative pressure chamber 32 whereby the valve member 26 changes its position so as to increase the valve opening or the effective area of the orifice 25. The action of the control valve 22 in this manner causes lowering of the positive pressure $P_2$ in the control section 18a of the exhaust gas recirculation passage 18.

Since the quantity of the recirculated exhaust gas, i.e. flow rate of the exhaust gas through the recirculation passage 18, is determined by the area (fixed) of the orifice 20 and the pressure difference $P_1 - P_2$ across the orifice 20, the quantity of the recirculated exhaust gas increases as the pressure $P_2$ downstream of the orifice 20 lowers. There will be no need of explaining that the quantity of the recirculated exhaust gas decreases when the control circuit 80 commands the electromagnetic valve 70 to decrease its opening thereby to diminish the magnitude of the signal negative pressure $P_0$.

Thus the quantity of the recirculated exhaust gas can be varied through the regulation of the pressure $P_2$ in the control section 18a of the recirculation passage 18 in compliance with changes in the operating condition of the engine 10.

The exhaust gas pressure $P_1$ in the recirculation passage 18 upstream of the orifice 20 varies in proportion to the flow rate of exhaust gas through the exhaust passage 16. Accordingly the quantity of the recirculated exhaust gas can be made, if desired, substantially proportional to the flow rate of exhaust gas through the exhaust passage 16, whereby the rate of EGR is maintained substantially constant, by keeping the magnitude of the pressure $P_2$ in the control section 18a of the recirculation passage 18 approximately constant (or by lowering the pressure $P_2$ as the quantity of air taken into the engine 10 increases). In such a case, the control circuit 80 commands the electromagnetic valve 70 to keep the magnitude of the negative pressure $P_0$ constant.

Independently of the degree of opening of the EGR control valve 22, the pressure $P_2$ in the control section 18a of the recirculation passage 18 varies by the influence of intake vacuum communicating to this section 18a through the orifice 25. While the degree of opening of the control valve 22 is kept constant, the pressure $P_2$ lowers as the engine operating condition shifts towards lower load conditions. In the control system according to the invention, the differential pressure modulator 40 serves the function of cancelling fluctuations of the pressure $P_2$ by the influence of intake vacuum. By this reason, the pressure $P_2$ is transmitted through the conduit 54 to the compensation pressure chamber 48 of the modulator 40.

Assume that the pressure $P_2$ is caused to lower by an augmentation of the magnitude of intake vacuum while the degree of opening of the control valve 22 is kept constant, meaning that the magnitude of the signal negative pressure $P_0$ is kept constant. Then the larger diaphragm 44 of the modulator 40 deflects somewhat towards the chamber 48 and accordingly the smaller diaphragm 42 is forced to deflect towards the negative pressure chamber 46, resulting in an augmentation of the admission of atmospheric air into the conduit 56 and hence a decrease in the magnitude of the control negative pressure $P_3$. Thus the valve member 26 of the control valve 22 is moved so as to decrease the effective opening area of the orifice 25 until the pressure $P_2$ rises to a value before the augmentation of intake vacuum. An unintentional rise of the pressure $P_2$ causes the diaphragms 42 and 44 of the modulator 40 to deflect towards the atmospheric pressure chamber 50, whereby the magnitude of the control negative pressure $P_0$ increases until the rise of the pressure $P_2$ is cancelled by the action of the control valve 22.

FIG. 2 shows the use of an electromagnetic valve 70 of the on-off functioning type as an alternative of the electromagnetic valve 70 of the continuously functioning type. In the case of FIG. 2 the conduit 72 is completely blocked by a valve member 90a of the electromagnetic valve 90 while, for example, the valve 90 remains deenergized but is fully opened when the valve member 90a changes its position upon energization of the valve 90. The control circuit 80 is modified so as to provide a pulse signal S' to the on-off type electromagnetic valve 90 as a control signal corresponding to the signal S in the embodiment of FIG. 1.

As another modification of the embodiment of FIG. 1, the negative pressure limiting valve 60 may be replaced by a divergent orifice 78 as shown in FIG. 2.

By the use of an EGR system according to the invention, the rate of EGR can be controlled in the most desirable manner with high reliability and exceeding accuracy. Since the control circuit 80 memorizes an EGR rate control pattern which shows an optimum EGR rate for every operating condition of the engine 10 and produces the control signal S or S' based on actual operating conditions of the engine 10 detected, for example, by the sensors 82, 84 and the memorized control pattern, an optimum rate of EGR is realized (through the control of the pressure $P_2$ in the control section 18a of the recirculation passage 18) at every moment or under every condition of the engine operation. Since the control negative pressure $P_3$ for operating the EGR control valve 22 to control the pressure $P_2$ does not directly depend on intake vacuum but is regulated according to desired rates of EGR, the control of the pressure $P_2$ and hence the control of EGR rate can be accomplished exactly as intended. Since the differential pressure modulator 40 not only serves for regulation of the control negative pressure $P_3$ but also has the function of cancelling unintentional fluctuations of the pressure $P_2$ by the influence of intake vacuum, the pressure $P_2$ can be controlled exceedingly accurately.

When the rate of EGR is controlled by a system according to the invention so as to become optimum under every condition of the engine operation, the emission of NOx can be suppressed satisfactorily over the entire range of engine operating conditions without impairing smoothness of engine operation and output characteristic of the engine. Besides, the use of this EGR system will produce an improvement on the fuel economy of the engine.

What is claimed is:

1. A system for recirculation of exhaust gas in an internal combustion engine provided with an intake passage and an exhaust passage, the system comprising:
   means for defining a recirculation passage interconnecting said exhaust passage to said induction passage to recirculate a portion of the engine exhaust gas;
   a metering orifice of a fixed area formed in said recirculation passage;
   vacuum operated valve means for controlling an effective cross-sectional area of said recirculation passage at a section downstream of said metering orifice;
   pressure modulation means for modulating a vacuum produced in said induction passage with air based on a comparison between a signal negative pressure and an exhaust gas pressure in a control section of said recirculation passage between said metering orifice and said valve means thereby to produce a control negative pressure to operate said valve means;
   a conduit which connects said induction passage to said pressure modulation means to transmit said vacuum and has an air admission port opening into the atmosphere, said signal negative pressure being produced by modulation of a negative pressure in said conduit with atmospheric air admitted into said conduit through said air admission port;
   an electromagnetic valve provided to said conduit at a section between said induction passage and said air admission port so as to vary the magnitude of a negative pressure at said air admission port of said conduit thereby to vary the magnitude of said signal negative pressure;
   a plurality of sensors each for sensing a parameter of engine operating conditions and producing an electrical signal representing the sensed parameter; and
   electronic control means for providing a control signal to said electromagnetic valve to control the magnitude of said signal negative pressure and hence the magnitude of said control negative pressure such that said exhaust gas pressure is regulated to a value corresponding to an optimum rate of exhaust gas recirculation under an engine operating condition indicated by the signals produced by said sensors, said optimum rate of exhaust gas recirculation being prescribed in an exhaust gas recirculation rate control pattern memorized in said control means.

2. A system as claimed in claim 1, wherein said pressure modulation means comprise a first flexible diaphragm which serves as a partition between an atmospheric pressure chamber and a negative pressure chamber and a second flexible diaphragm which has a larger area than said first diaphragm and is spaced from said first diaphragm so as to serve as a partition between said negative pressure chamber and a pressure chamber communicating with said control section of said recirculation passage, said first and second diaphragms being connected by a rigid rod so as to deflect simultaneously, said conduit opening into said negative pressure chamber, the system further comprising a negative pressure transmission conduit connecting said induction passage to said valve means and an air admission conduit which branches from said negative pressure transmission conduit and opens into said atmospheric pressure chamber of said pressure modulator to produce said control negative pressure by modulating said vacuum with atmospheric air, said pressure modulator further comprising a valve member attached to said first diaphragm such that the admission of air into said air admission conduit is suppressed as said first diaphragm deflects towards said atmospheric pressure chamber.

3. A system as claimed in claim 2, wherein said valve means comprise a flexible diaphragm which serves as a partition between a negative pressure chamber and an atmospheric pressure chamber and a valve member which is disposed in said recirculation passage and has a stem protruded into said atmospheric pressure chamber of said valve means and fixed to said diaphragm.

4. A system as claimed in claim 2, wherein said conduit is provided, at a section between said induction passage and said electromagnetic valve, with a pressure limiting valve means for limiting the maximum magnitude of a negative pressure to be transmitted through said electromagnetic valve.

5. A system as claimed in claim 2, wherein said conduit is provided, at a section between said induction passage and said electromagnetic valve, with a divergent orifice to limit the maximum magnitude of a negative pressure to be transmitted through said electromagnetic valve.

6. A system as claimed in any of claims 1 to 5, wherein said electromagnetic valve is of the type capable of continuously varying an effective cross-sectional area of said conduit connecting said induction passage to said pressure modulation means.

7. A system as claimed in any of claims 1 to 5, wherein said electromagnetic valve is of the on-off functioning type capable of intermittently blocking fluid communication through said conduit connecting said induction passage to said pressure modulation means.

* * * * *